US007672076B2

(12) United States Patent
Nakao et al.

(10) Patent No.: US 7,672,076 B2
(45) Date of Patent: *Mar. 2, 2010

(54) SERVO WRITER AND SERVO WRITING METHOD

(75) Inventors: Toru Nakao, Kanagawa (JP); Takahisa Izumida, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1580 days.

This patent is subject to a terminal disclaimer.

(21) Appl. No.: 10/899,104

(22) Filed: Jul. 27, 2004

(65) Prior Publication Data

US 2005/0052779 A1 Mar. 10, 2005

(30) Foreign Application Priority Data

Sep. 5, 2003 (JP) ............................. 2003-313900

(51) Int. Cl.
*G11B 5/584* (2006.01)
(52) U.S. Cl. ....................................... 360/77.12; 360/75
(58) Field of Classification Search ....................... None
See application file for complete search history.

(56) References Cited

U.S. PATENT DOCUMENTS 4,996,609 A 2/1991 Joannou

| 5,101,309 | A | 3/1992 | Mitsuhashi |
| 5,689,384 | A | 11/1997 | Albrecht et al. |
| 6,172,833 | B1 | 1/2001 | Fry et al. |
| 6,347,016 | B1 | 2/2002 | Ishida et al. |
| 6,700,729 | B1 * | 3/2004 | Beck et al. ..................... 360/76 |
| 6,970,312 | B2 * | 11/2005 | Yip et al. ........................ 360/48 |
| 7,031,087 | B2 * | 4/2006 | Hashimoto .................... 360/53 |
| 7,130,140 | B1 * | 10/2006 | Boyer et al. ................... 360/48 |
| 2007/0223125 | A1 * | 9/2007 | Ohtsu ............................. 360/46 |

FOREIGN PATENT DOCUMENTS

JP         8-30942 A        2/1996
JP     2003141836 A    *   5/2003

* cited by examiner

*Primary Examiner*—Jason C Olson
(74) *Attorney, Agent, or Firm*—Sughrue Mion, PLLC (57) ABSTRACT

Disclosed are a servo writer and a servo writing method capable of writing a servo signal onto a servo band of a magnetic tape in an excellent condition, regardless of the thickness of the magnetic tape. The servo writer includes a magnetic tape traveling system for traveling a magnetic tape, a DC erase head for magnetizing a servo band of the magnetic tape in one direction along the length of the magnetic tape, a servo signal write head for writing a servo signal onto the servo band in the direction opposite to the one direction, a servo signal read head for reading the servo signal from the servo band, and control device for controlling a degauss current supplied to the DC erase head, based on an output read from the servo signal by the servo signal read head.

14 Claims, 6 Drawing Sheets

OUTPUT SIGNAL FROM SERVO READ ELEMENT

SERVO WRITER AND SERVO WRITING METHOD

BACKGROUND OF THE INVENTION

1. Field of the Invention

The present invention relates to a servo writer and a servo writing method for writing a servo signal onto a servo band of a magnetic tape.

2. Description of the Related Art

In recent years, high density recording design in magnetic tapes has advanced, and some magnetic tapes for backup mediums of computers have a recording capacity of several hundreds of gigabytes. Magnetic tapes therefore have several hundreds of data tracks along the width thereof. Such high density recording design involves narrowing of the data tracks and of the intervals between the adjacent data tracks in a magnetic tape. Thus, in order to allow recording/reproducing devices of a magnetic head to trace such narrow data tracks, servo signals are written onto a magnetic tape in advance, and the servo signals are then read by the magnetic head, while the position of the magnetic head relative to the magnetic tape (the position along the width of the magnetic tape) is servo-controlled (refer to Japanese Unexamined Patent Application (KOKAI) Heisei No. 8-30942 (Paragraph No. 0016 and FIG. 1)).

Figures 5A, 5B:
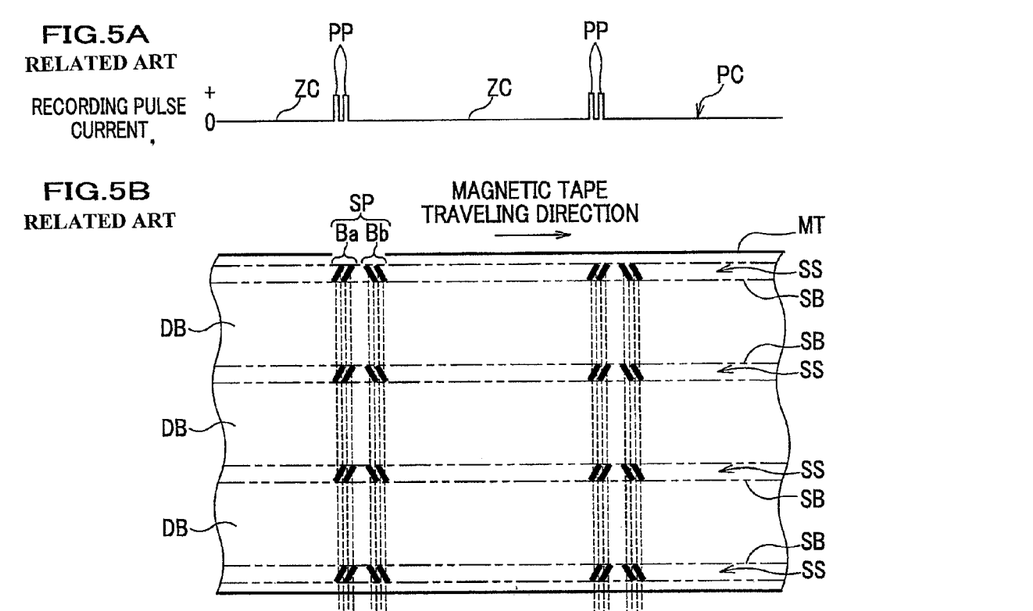
FIG. 5A is a view depicting a recording current when a servo signal is written onto a magnetic tape in a conventional mode.
FIG. 5B is a plane view depicting the magnetic tape of FIG. 5A.

The above servo signals are written onto the servo bands of a magnetic tape with a servo writer, by applying a recording current to a magnetic head of the servo writer so as to magnetize the non-magnetized servo bands in one direction. Conventionally, as shown in FIG. 5A, the servo signals SS are recorded onto the corresponding non-magnetized servo bands SB, by feeding, to a magnetic head, a recording pulse current PC constituted of a zero current ZC and a plus pulse current PP, as a recording current. In the recording pulse current PC, as shown in FIG. 5B, when the zero current ZC out of the recording pulse current PC is fed to the magnetic head, the servo bands SP are not magnetized. On the other hand, when the plus pulse current PP is fed thereto, due to leakage flux generated from the head gaps of the magnetic head, the servo bands SB are magnetized in one direction to form servo patterns SP, so that the servo signals SS are written onto a magnetic tape MT. Here, each space between the adjacent servo bands SB serves as a data band DB onto which data signals are to be written.

Each servo signal SS is formed by repeating, at predetermined intervals in the length of the magnetic tape MT, a servo pattern SP including a burst Ba and a burst Bb. Incidentally, the burst Ba is a portion which is constituted of two magnetized stripes having a slope of positive angles relative to the traveling (transport) direction, and the burst Bb is a portion which follows the burst Ba and which is constituted of two magnetized stripes having a slope of negative angles relative to the traveling direction. Here, each servo pattern SP is constituted of four stripes having slopes of positive and negative angles in twos, but modifications can be made as appropriate. For example, it may be constituted of ten stripes having slopes of positive and negative angles in fives and, further two types of servo patters SP may be alternately arranged; one is constituted of ten stripes having slopes of positive and negative angles in fives and the other is constituted of eight stripes in fours. In FIG. 5B, the servo patterns SP are enlarged relative to the magnetic tape MT, for the sake of understanding.

Figure 5C:
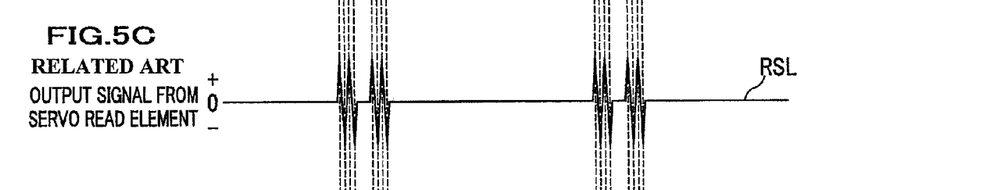
FIG. 5C is a view depicting an output read from the servo signal that has been written onto the magnetic tape by a wide recording device.

The magnetic tape recording/reproducing device has at least one servo signal read device, such as MR element which changes its electrical resistance in accordance with a magnetic quantity. The magnetic tape recording/reproducing device detects, based on the variation of electrical resistance of the above MR element, the variation of the magnetic field generated from the servo signal SS, and outputs the variation of the magnetic field as a read signal in a differential waveform mode (voltage value). As the variation of electrical resistance of the MR element is increased, the peak voltage value obtained by reading the servo signal SS is increased. As a result, the output read from the servo signal SS has an improved S/N ratio. Accordingly, when the magnetic field generated from the servo signal SS has a great variation, or when the servo signal read device (MR element) has a large sensing area due to its wide dimensions, the output RSL read from the servo signal SS is increased as shown in FIG. 5(c).

Figure 5D:
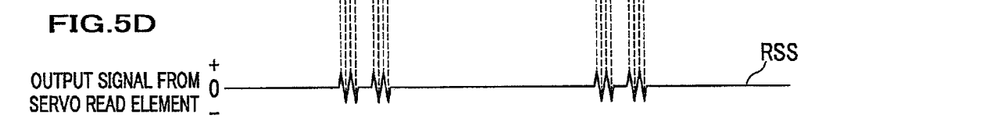
FIG. 5D is a view depicting an output read from the servo signal on the thin magnetic tape.

In future, it is expected that magnetic tapes will advance to have a memory capacity of several tens of terabytes. As such high density recording design proceeds, the number of data tracks formed on a magnetic tape is increased, the width of data tracks and interval between adjacent data tracks are further narrowed, and a magnetic tape itself is thinned. Accompanied with this, magnetic quantity which can be detected from the servo signals SS on a magnetic tape is decreased. Further, the variation of the magnetic quantity which can be detected from the servo signals SS by the servo signal read device of a magnetic head is also decreased. Due to this decrease, the output RSS read from the servo signal SS has a low peak voltage value as shown in FIG. 5D, in other words, the S/N ratio of the output RSS is deteriorated. Finally, the magnetic tape recording/reproducing device cannot read the servo signals SS correctly, whereby the position of the magnetic head is unable to be controlled with high precision.

Figure 6A:
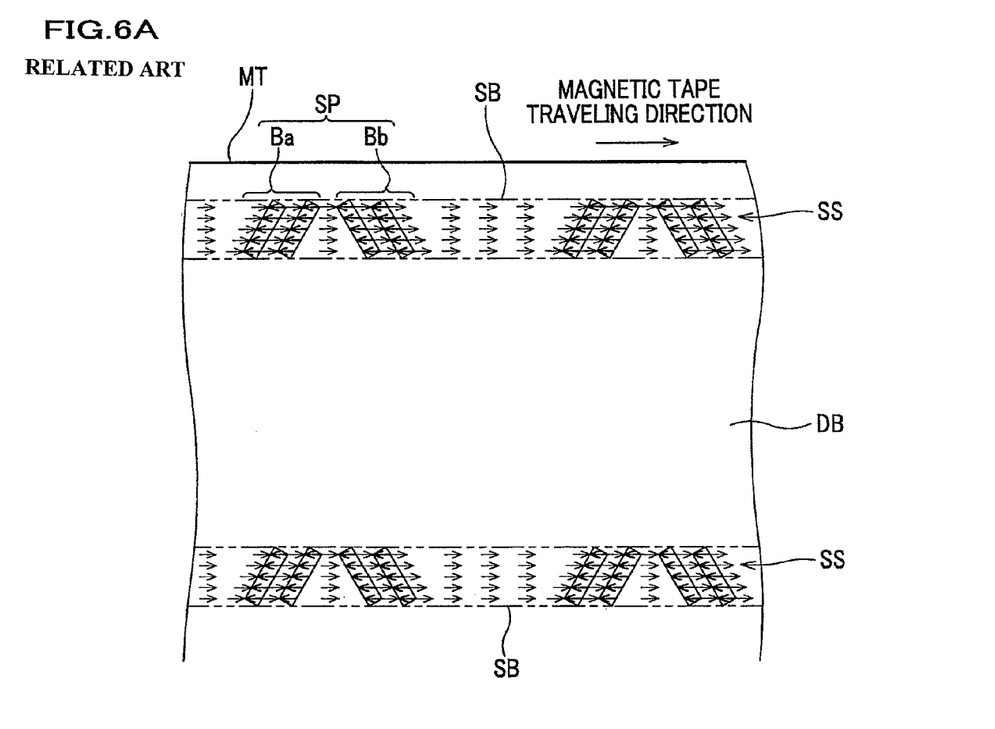
FIG. 6A is an enlarged plane view depicting a state of a magnetic tape which is subjected to a DC magnetization.
Figure 6B:
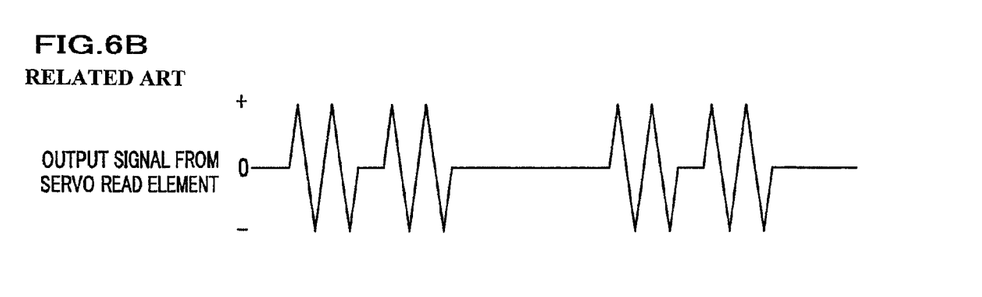
FIG. 6B is a view depicting an output read from a servo signal on the magnetic tape of FIG. 6A.

In view of the above problem, the applicant has previously discovered that the servo bands SB of a magnetic tape MT are magnetized by use of a DC erase head (not shown) in one direction (i.e., DC magnetization) along the length of the magnetic tape MT, and the servo signals SS are then recorded onto the servo bands SB by magnetizing them in the direction opposite to the one direction (refer to FIG. 6A). Incidentally, in FIG. 6A, the magnetized directions are denoted by small arrows. The output (peak voltage value) which is read from the servo signal SS by the servo signal read device depends on a variation ratio or amount at a boundary between portions onto which a signal is not recorded and onto which a signal is recorded. For this reason, an orientation of a magnetic field greatly changes from the forward to reverse directions at the boundary between the forwardly magnetized portion and the reversely magnetized portion on each servo band. Similarly, the orientation of a magnetic field greatly changes from the reverse to forward directions at the boundary between the reversely magnetized portion and the forwardly magnetized portion. This makes it possible to obtain the large output from the servo signal SS, as shown in FIG. 6B. In other words, it is possible to improve the S/N ratio of the output.

In the above technique, however, a constant current is fed to a DC erase head and a servo signal write head in the servo writer. This causes a problem that, when the servo signal is written by the single servo writer onto a servo band on different thin magnetic layers of magnetic tapes, the reproducing characteristics of the servo signal differ depending on the thicknesses of the magnetic layers. For example, there is a possibility that the reproduction of the servo signal exhibits excellent characteristics against thin magnetic tapes, whereas it exhibits faulty characteristics against thick tapes.

SUMMARY OF THE INVENTION

In consideration of the above problem, the present invention is made. Specifically, an aspect of the present invention is to provide a servo writer and a servo writing method capable of writing a servo signal onto a servo band on a magnetic layer in an excellent condition, regardless of the level of thickness of the magnetic layer.

According to a feature of the present invention, a servo writer for writing a servo signal onto a servo band on a magnetic layer of a magnetic tape is constituted as follows:

(a) A magnetic tape traveling system includes a supply reel and a take-up reel, and is for traveling the magnetic tape by taking up the magnetic tape being fed from the supply reel with the take-up reel;

(b) A DC erase head is for magnetizing at least the servo band in one direction along length of the magnetic tape, while being in contact with the traveling magnetic tape;

(c) A servo signal write head is for writing the servo signal onto the servo band by magnetizing the servo band in a direction opposite to the one direction, while being in contact with the traveling magnetic tape, and is provided downstream of the DC erase head in a traveling direction of the magnetic tape;

(d) A servo signal read head is for reading the servo signal that has been written onto the servo band, while being in contact with the traveling magnetic tape, and is provided downstream of the servo signal write head in the traveling direction of the magnetic tape; and (e) A control device is for controlling a recording current supplied to the DC erase head, the servo signal write head or both thereof, based on an output read from the servo signal by the servo signal read head.

In the servo writer of the present invention, when the magnetic tape is run by the magnetic tape traveling system, the servo band of the magnetic tape is magnetized in one direction along the length of the magnetic tape by the DC erase head, and is then magnetized in a direction opposite to the one direction by the servo signal write head. The servo signal that has been written onto the servo band in such a manner is read by the servo signal read head, and the output read from the servo band is then transmitted to the control device. Further, this control device controls a recording current supplied to, for example, the DC erase head, based on the output, so that the output is of a predetermined value. Thanks to this control, the DC erase head subjects the servo band to DC magnetization with magnetization force based on the controlled recording current.

According to another feature of the present invention, a servo writer for writing a servo signal onto a servo band on a magnetic layer on a magnetic tape, the servo band having been magnetized in one direction along length of the magnetic tape, is constituted as follows:

(a) A magnetic tape traveling system includes a supply reel and a take-up reel, and is for traveling the magnetic tape by taking up the magnetic tape being fed from the supply reel with the take-up reel;

(b) A servo signal write head is for writing the servo signal onto the servo band by magnetizing the servo band in a direction opposite to the one direction, while being in contact with the traveling magnetic tape;

(c) A servo signal read head is for reading the servo signal that had been written onto the servo band, while being in contact with the traveling magnetic tape, and is provided downstream of the servo signal write head in a traveling direction of the magnetic tape; and (d) A control device is for controlling a recording current supplied to the servo signal write head, based on an output read from the servo signal by the servo signal read head.

With this servo writer, the servo signal is written onto the servo band by means of controlled magnetizing force generated from the servo signal write head. This enables the output read from the servo signal to fall within a predetermined range, even if the magnetic tape has been subjected to the DC magnetization in, for example, a pre-process.

The servo writer of the present invention may further include an amplifier which amplifies the output read from the servo signal by the servo signal read head and which transmits the amplified output to the control device.

With this amplifier, the output read by the servo signal read head is amplified, and the amplified output is then transmitted to the control device. Because of this amplified output, the control device can appropriately control the recording current, even if the output is of a very low value.

According to still another feature of the present invention, a servo writing method for writing a servo signal onto a servo band on a magnetic layer of a magnetic tape is constituted as follows:

(a) A DC magnetizing step is to magnetize the servo band in one direction along length of the magnetic tape by a DC erase head;

(b) A servo writing step is to write the servo signal onto the servo band by magnetizing the servo band in a direction opposite to the one direction by a servo signal write head;

(c) A reading step is to read the servo signal; and (d) A control step is to control a recording current supplied to the DC erase head, the servo signal write head or both thereof, based on an output having been read from the servo signal in the reading step.

By this servo writing method, the recording current supplied to the DC erase head, the servo signal write head or both thereof is controlled based on the output read from the servo signal in the reading and control processes. Accordingly, the magnetizing force generated from the DC erase head, the servo signal write head or both thereof is adjusted. This makes it possible to write the servo signal onto the servo band on the magnet layer so as to obtain the desired output value from the servo signal, regardless of the level of thickness of the magnetic layer.

The servo writing method of the present invention may further include an amplifying step for amplifying the servo signal having been read in the reading step between the reading and control steps.

In this amplifying step, the output which has been read from the servo signal in the reading step is amplified and is then used in the control step, making it possible to appropriately control the recording current by use of the amplified output in the control step, even if the output is of a very low level.

With the servo writer and the servo writing method of the present invention, the recording current supplied to the DC erase head, the servo signal write head or both thereof is controlled based on the output from the servo signal having been written once, so that the output is kept to have a substantially constant value. This enables the servo signal to be appropriately written onto the servo band on the magnetic layer of the magnetic tape, regardless of the level of thickness of the magnetic layer.

Features and objects of the present invention other than the above will become clear by reading the description of the present specification with reference to the accompanying drawings.

BRIEF DESCRIPTION OF THE DRAWINGS

For a more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

At least the following matters will be made clear by the explanation in the present specification and the description of the accompanying drawings.

Figure 1:
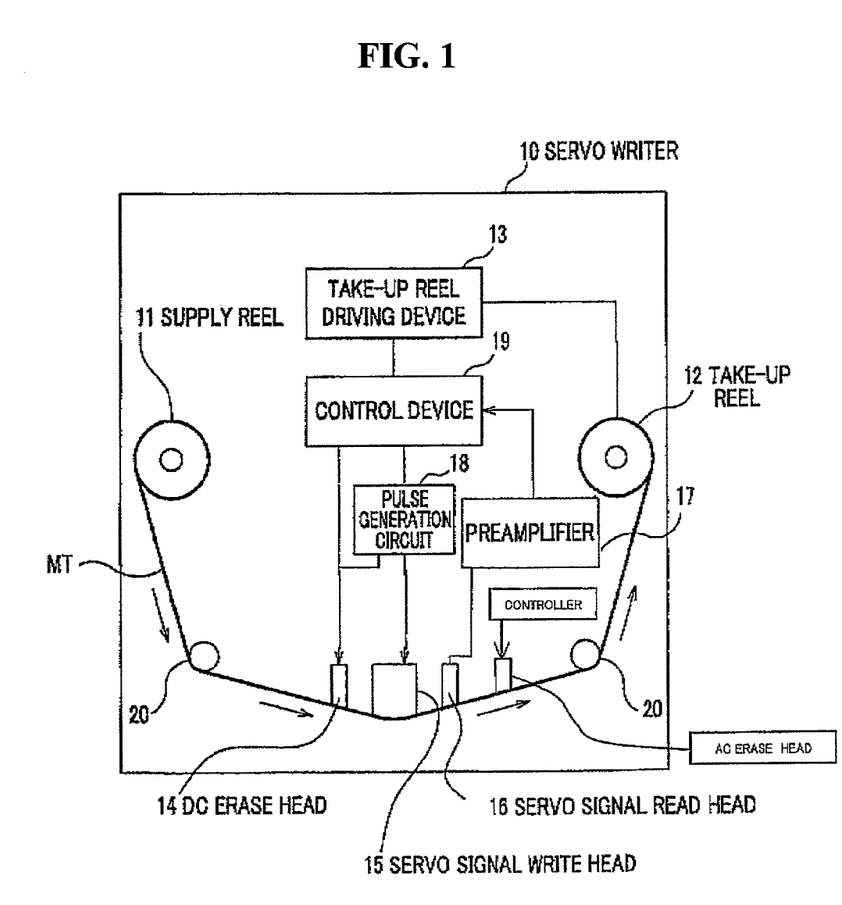
FIG. 1 is a front view depicting a servo writer according to an embodiment of the present invention.
Figure 2:
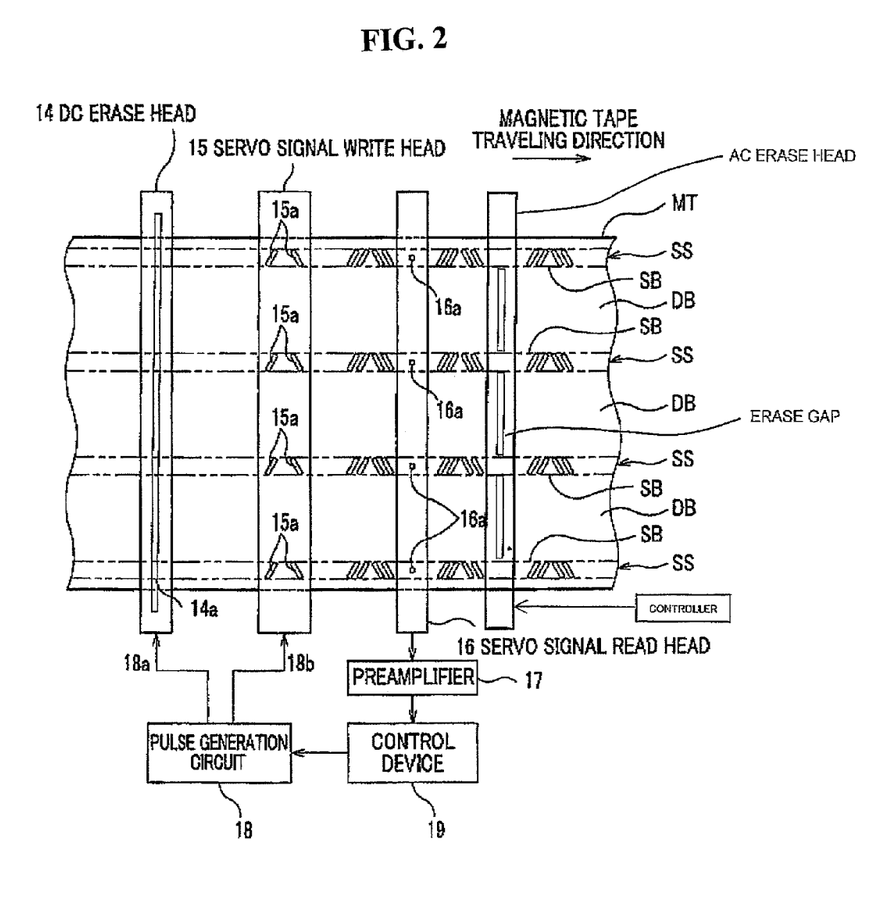
FIG. 2 is a plane view depicting magnetic heads of the servo writer in detail.
Figure 3:
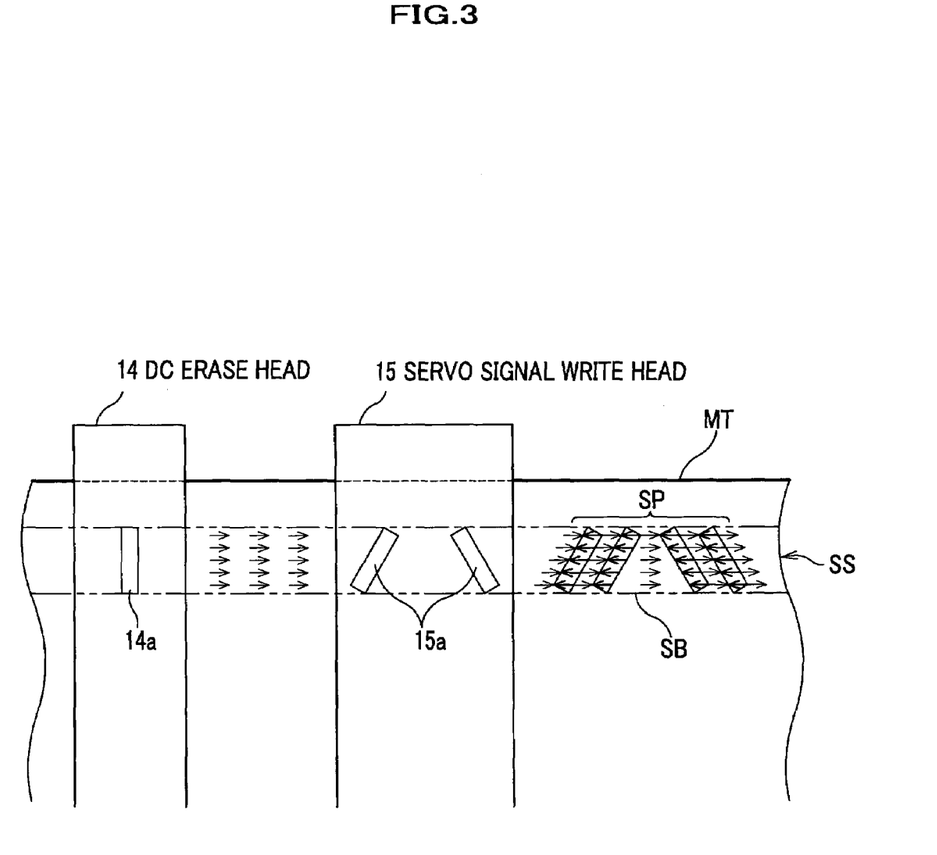
FIG. 3 is a partially enlarged view depicting the head gaps of the magnetic heads of FIG. 2.
Figure 4:
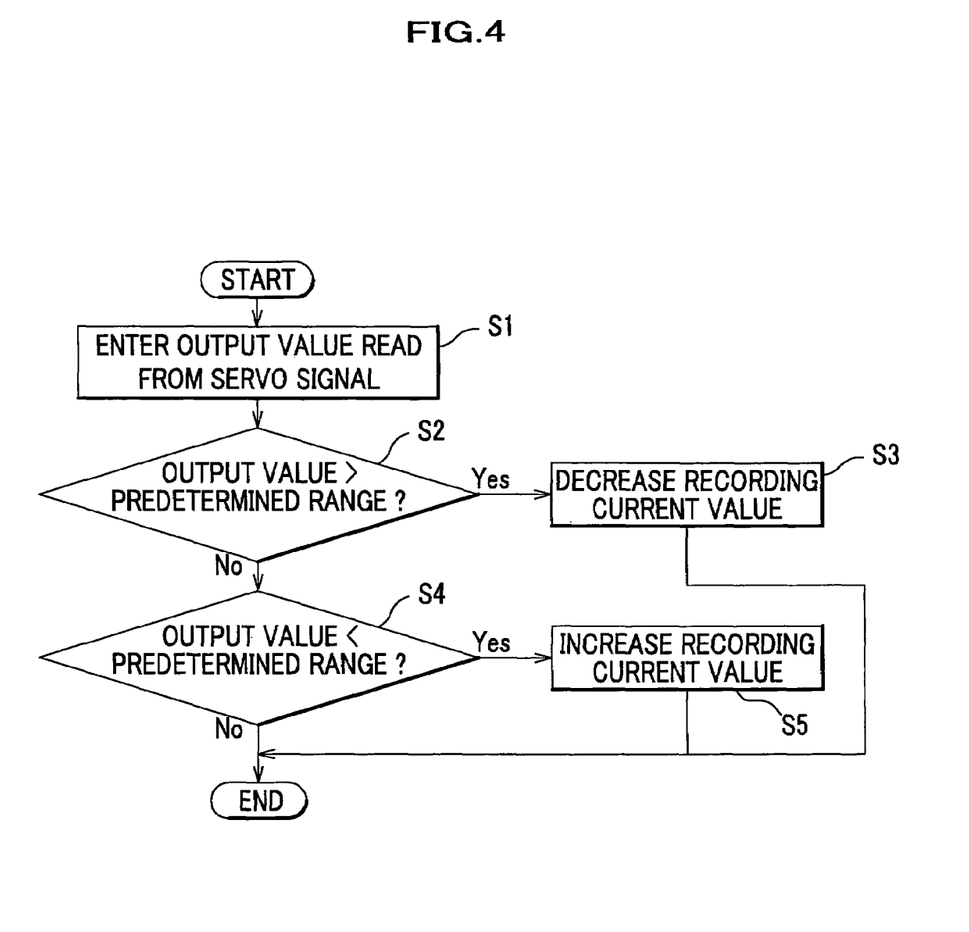
FIG. 4 is a flow chart depicting a control flow of a control device according to the embodiment of the present invention.

An embodiment of a servo writer according to the present invention will be described below in detail with reference to the figures as appropriate. In the figures, FIG. 1 is a front view depicting a servo writer according to this embodiment; FIG. 2 is a plane view depicting magnetic heads of the servo writer in detail; FIG. 3 is a partially enlarged view depicting the head gaps of the magnetic heads of FIG. 2; and FIG. 4 is a flow chart depicting a control flow of a control device according to this embodiment.

As shown in FIG. 1, a servo writer 10 includes, as main components, a supply reel 11, a take-up reel 12, a take-up reel driving device 13, a DC erase head 14, a servo signal write head 15, a servo signal read head 16, a preamplifier 17, a pulse generation circuit 18, a control device 19 and a plurality of guides 20. The servo writer 10 further includes a power source device, a verifying device for testing a servo signal having been written by the servo signal write head 15, etc, which all are not shown in the figure. A description will be given below in detail of each component of the servo writer 10.

A magnetic tape MT which has been formed by cutting a wide web source into a product-width is set by a large-diameter reel at the supply reel 11. The supply reel 11 feeds the magnetic tape MT upon writing of servo signals thereonto. The magnetic tape MT fed from the supply reel 11 is guided by guides 20, etc, and is then taken up by the take-up reel 12 through the DC erase head 14, the servo write head 15 and the servo signal read head 16. Incidentally, the take-up reel 12 is rotatably driven by the take-up reel driving device 13.

The take-up reel driving device 13, which rotatably drives the take-up reel 12, includes a motor, a motor driving circuit for supplying a current to the motor, and a gear for coupling the shaft of the motor with the take-up reel 12, which all are not in the figure. The take-up reel driving device 13 generates a motor current in the motor driving circuit, based on a motor current signal entered from the control device 19, supplies the motor current to the motor, and then transmits rotating driving power of the motor to the take-up reel 12 through the gear. As a result, the take-up reel 12 is rotatably driven.

As shown in FIG. 2, the DC erase head 14 magnetizes servo bands SB of the magnetic tape MT in one direction (i.e., DC magnetization) along the length of the magnetic tape MT, while being in contact with the running magnetic tape MT. This DC erase head 14 includes coils (not shown) for generating a magnetic field, and four head gaps 14a, 14a, 14a and 14a arranged in a line with corresponding to four servo bands SB, SB, SB and SB along the width of the magnetic tape MT. Each head gap 14a is formed to a rectangle form by means of a lithography technique to which a semiconductor technique is applied. The DC erase head 14 magnetizes the magnetic layer of the magnetic tape MT by means of leakage flux generated from the head gaps 14a when the pulse generation circuit 18 supplies a degaussing current (recording current) 18a to the DC erase head 14. In this embodiment, the magnetic layer of the magnetic tape MT is magnetized in the traveling direction of the magnetic tape MT (hereinafter, referred to as "forward direction") (see FIG. 3).

The servo signal write head 15 writes the servo signals SS onto the servo bands SB by magnetizing, in the reverse direction, the servo bands SB which has been subjected to the DC magnetization in the forward direction by the DC erase head 14, while being contact with the running magnetic tape MT. Besides, the servo signal write head 15 is provided downstream of the DC erase head 14 in the traveling direction of the magnetic tape MT (hereinafter simply referred to as "downstream side"). This servo signal write head 15 includes coils (not shown) for generating magnetic fields, and four head gaps 15a, 15a, 15a and 15a arranged in a line with corresponding to the four servo bands SB, SB, SB and SB along the width of the magnetic tape MT. Each head gap 15a has a trapezoid shape of which sides each form a predetermined angle with respect to the length of the magnetic tape MT. Note that the head gaps 15a are formed by means of the lithography technique which is mainly employed in semiconductor fabricating technique. Also, the servo signal write head 15 writes the servo signals SS onto the magnetic layer of the magnetic tape MT by magnetizing the magnetic layer by means of leakage flux generated from the head gaps 15a, when the pulse generation circuit 18 supplies a recording pulse current (recording current) 18b to the servo signal write head 15. In this regard, the servo signals SS are written onto the magnetic tape MT in the forward direction.

The servo signal read head 16, which reads the servo signals SS having been written onto the servo bands SB while being in contact with the running magnetic tape MT, is provided downstream of the servo signal write head 5. This servo signal read head 16 has MR elements 16a corresponding to the servo bands SB in a one-to-one relationship, and detects, by use of these MR elements 16a, the variations of magnetic field from the servo signals SS, based on the variations of their electrical resistances, respectively.

The MR elements 16a may not be provided corresponding to the servo bands SB in a one-to-one relationship, and a single MR element 16a may be provided corresponding to merely one of the servo bands SB, for example. However, when the MR elements 16a are provided corresponding to the servo bands SB in a one-to-one relationship as with this embodiment, all the servo bands SB can appropriately be magnetized. It is because if the magnetic tape MT has a nonuniform thickness along the width, then the degaussing current 18a or the recording pulse current 18b can be controlled so as to adapt for the highest or lowest output value among the output values read from the servo signals SS on the servo bands SB.

The preamplifier 17 amplifies the outputs read, by the servo signal read head 16, from the servo signals SS, and transmits the amplified outputs to the control device 19. The preamplifier 17 is connected to the servo signal read head 16 and the control device 19.

A pulse generation circuit 18 supplies the recording pulse current 18b of a predetermined value to the servo signal write head 15, based on a signal transmitted from the control device 19 upon writing of the servo signal SS. The pulse generation circuit 18 also continuously supplies the degaussing current 18a of a predetermined value to the DC erase head 14, based on the signal transmitted from the control device 19.

The control device 19, which controls the operation of each component of the servo writer 10, includes a central processing unit (CPU) and various memories. This control device 19 generates a motor current signal for controlling the motor current of the take-up reel driving device 13 and transmits it to the take-up reel driving device 13, in order to maintain the magnetic tape MT at a constant traveling speed upon writing of the servo signal SS.

The control device 19 generates a pulse control signal for controlling the plus pulse current value, pulse width and generation timing of the recording pulse current 18b, and transmits it to the pulse generation circuit 18, in order to form a servo signal SS in the predetermined servo pattern SP (refer to FIG. 3). Specifically, the control device 19 generates a pulse pattern constituted of the plus pulse current, zero current, plus pulse current and zero current.

Moreover, the control device 19 sets the value of the degaussing current 18a, based on the output which is read from the servo signal SS by the servo signal read head 16 and which is amplified by the preamplifier 17, so that the output is kept substantially constant (within a predetermined range). The control device 19 then transmits the output to the pulse generation circuit 18. In other words, the control device 19 controls the degaussing current 18a, based on the output read from the servo signal SS by the servo signal read head 16.

In this embodiment, the control device 19 is targeted only for the degaussing current 18a, but the present invention is not limited to this. For example, it may be targeted only for the recording pulse current 18b, or both the degaussing current 18a and the recording pulse current 18b.

Continuously, a description will be given of a mode in which the control device 19 controls the degaussing current 18a. As shown in FIG. 4, when the output read from the servo signal SS is entered into the control device 19 (STEP S1), it is determined whether or not the value of the output exceeds a predetermined range (an upper limit value) (STEP S2). In the STEP S2, if it is determined that the value of the output exceeds the predetermined range (YES), then the control device 19 sets such that the degaussing current 18a is decreased to a predetermined value (STEP S3). Then, this control is ended.

Alternatively, in STEP S2, unless it is determined that the value of the output exceeds the predetermined range (NO), then it is determined whether or not the value of the output is below the predetermined range (a lower limit value) (STEP S4). In STEP S4, if it is determined that the value of the output is below the predetermined range (YES), then the control device 19 sets such that the degaussing current 18a is increased to the predetermined value (STEP S5). Then, this control is ended. Beside, in STEP 4, if it is determined that the value of the output falls within the predetermined range, then the control device 19 maintains the degaussing current 18a as it is, and this control is then ended.

Next, a description will be given of a method for writing a servo signal onto the magnetic tape MT by use of the servo writer 10 described above (servo writing method).

As shown in FIG. 1, firstly, a reel of the magnetic tape MT is set at the supply reel 11 of the servo writer 10, and the one end of the magnetic tape MT is then coupled to the core of the take-up reel 12. The magnetic tape MT is run while being guided by the guides 20, etc and being taken up by the take-up reel 12 driven by the take-up reel driving device 13.

Next, as shown in FIG. 3, the DC erase head 14 magnetizes the servo bands SB of the magnetic tape MT in the forward direction (DC magnetizing process), and the servo signal write head 15 writes the servo signals SS onto the servo bands SB by magnetizing, in the reverse direction, the servo bands SB having been magnetized in the forward direction (servo writing process) Consequently, the reversely magnetized servo patterns SP are formed on the servo bands SB which have been magnetized in the forward direction.

Then, as shown in FIG. 2, the servo signals SS which have been written onto the servo bands SB are read by the servo signal read head 16 (reading process), and the outputs read from the read servo signals SS are amplified by the preamplifier 17 (amplifying process) and are transmitted to the control device 19. Further, the control device 19 sets the value of the degaussing current 18a such that the values of the outputs from the servo signals SS fall within a predetermined range, and transmits a signal for indicating the above setting to the pulse generation circuit 18 (control process).

The pulse generation circuit 18 supplies, to the DC erase head 14, the degaussing current 18a of a predetermined value, based on the signal from the control device 19. The DC erase head 14 then magnetizes the servo bands SB in the forward direction with magnetizing force based on the degaussing current 18a of the predetermined value. Subsequently, as described above, the servo signal write head 15 writes the servo signals SS onto the servo bands SB, and the servo signal read head 16 reads the servo signal SS therefrom. Note that the output values read from the servo signals SS are adapted to fall within the predetermined range, because the servo bands SB are magnetized with the magnetizing force of the predetermined amount.

As described above, a following effect can be achieved in this embodiment. The degaussing current 18a supplied to the DC erase head 14 is controlled based on the output values read from the servo signals SS which have been written once, so that the output values are substantially constant. Accordingly, the servo bands SB of the magnetic tape MT can appropriately be magnetized in accordance with the level of thickness of the magnetic layer. In other words, with the single servo writer 10, it is possible to write the servo signals SS onto magnetic layers of different thicknesses in magnetic tapes, such that the appropriate output values can be obtained from the servo signals SS.

As described above, the present invention is not limited to the above embodiment, but is implemented in various forms.

In this embodiment, the erase currents 18a of the same value are fed to the coils provided around the head gaps 14a of the DC erase head 14, respectively. However, the present invention is not limited to this, but the erase currents of different values may be fed to the coils. In this way, since a plurality of erase currents can separately be controlled based on outputs read from the servo signals SS by the MR elements 16a, respectively, it is possible to appropriately magnetize the individual servo bands SB, even if the magnetic layer has non-uniform evenness along the width.

In this embodiment, only the servo bands SB are magnetized by head gaps 14a formed in the DC erase head 14, but the present invention is not limited to this. For example, the head gaps of the DC erase head 14 may be formed to cover the width of the magnetic tape MT, and subjects the whole surface of the magnetic tape MT to the DC magnetization. In this case, it is preferable that is provided downstream of the DC erase head 14, an AC erase head which subjects, to the AC magnetization, the data bands DB that have undergone the DC magnetization.

In addition, when only the recording pulse current 18b supplied to the servo signal write head 15 is controlled, it is not necessary that the DC erase head 14 is provided in the servo writer 10. However, it should be noted that the magnetic tape MT to be set in the servo writer 10 is required to have been already subjected to the DC magnetization in the pre-process (for example, orientation process). In this case, it is preferred that is provided, an AC erase head which subjects the data bands DB of the magnetic tape MT to the AC magnetization, instead of the DC erase head 14 in the servo writer 10 of this embodiment. Here, the above AC magnetization means that magnetic powder in a magnetic layer is randomly directed in the forward or reverse direction.

The servo signal read device is not limited to the MR element, but may be an inductive element, for example.

Although the preferred embodiment of the present invention has been described in detail, it should be understood that various changes, substitutions and alterations can be made therein without departing from spirit and scope of inventions as defined by the appended claims.

What is claimed is:

1. A servo writer for writing servo signals onto corresponding servo bands of a magnetic tape, the servo writer comprising:
    a magnetic tape traveling system including a supply reel and a take-up reel, the magnetic tape traveling system for traveling the magnetic tape by taking up the magnetic tape being fed from the supply reel with the take-up reel;
    a DC erase head for magnetizing at least the servo bands in one direction along length of the magnetic tape, while being in contact with the traveling magnetic tape;
    a servo signal write head for writing the servo signals onto the corresponding servo bands by magnetizing the servo bands in a direction opposite to the one direction, while being in contact with the traveling magnetic tape, the servo signal write head being provided downstream of the DC erase head in a traveling direction of the magnetic tape;
    a servo signal read head for reading the servo signals that has been written onto the corresponding servo bands, while being in contact with the traveling magnetic tape, the servo signal read head being provided downstream of the servo signal write head in the traveling direction of the magnetic tape; and
    a control device for controlling a recording current supplied to the DC erase head based on outputs read from the servo signals by the servo signal read head.

2. A servo writer according to claim 1, further comprising an amplifier for amplifying the outputs being read from the servo signals by the servo signal read head and for transmitting the amplified outputs to the control device.

3. A servo writer according to claim 2, wherein the servo signal read head has no more MR elements than the servo bands of the magnetic tape.

4. A servo writer according to claim 2, wherein the DC erase head has head gaps formed corresponding to the servo bands along width of the magnetic tape.

5. A servo writer according to claim 4, wherein the servo signal read head has no more MR elements than the servo bands of the magnetic tape.

6. A servo writer according to claim 2, wherein the servo signal read head has no more inductive heads than the servo bands of the magnetic tape.

7. A servo writer according to claim 1, wherein the servo signal read head has no more MR elements than the servo bands of the magnetic tape.

8. A servo writer according to claim 1, wherein the DC erase head has head gaps formed corresponding to the servo bands along width of the magnetic tape.

9. A servo writer according to claim 8, wherein the servo signal read head has no more MR elements than the servo bands of the magnetic tape.

10. A servo writer according to claim 1, wherein the servo signal read head has no more inductive heads than the servo bands of the magnetic tape.

11. A servo writer for writing servo signals onto corresponding servo bands of a magnetic tape, the servo writer comprising:
    a magnetic tape traveling system including a supply reel and a take-up reel, the magnetic tape traveling system for traveling the magnetic tape by taking up the magnetic tape being fed from the supply reel with the take-up reel;
    a DC erase head for magnetizing at least the servo bands in one direction along length of the magnetic tape, while being in contact with the traveling magnetic tape;
    a servo signal write head for writing the servo signals onto the corresponding servo bands by magnetizing the servo bands in a direction opposite to the one direction, while being in contact with the traveling magnetic tape, the servo signal write head being provided downstream of the DC erase head in a traveling direction of the magnetic tape;
    a servo signal read head for reading the servo signals that has been written onto the corresponding servo bands, while being in contact with the traveling magnetic tape, the servo signal read head being provided downstream of the servo signal write head in the traveling direction of the magnetic tape; and
    a control device for controlling a recording current supplied to the DC erase head based on outputs read from the servo signals by the servo signal read head, wherein the DC erase head has head gaps which are formed to cover width of the magnetic tape, and which subject a whole surface of the magnetic tape to DC magnetization,
    the servo writer further comprising an AC erase head provided downstream of the DC erase head, the AC erase head subjecting a DC-magnetized data band to AC magnetization.

12. A servo writer for writing servo signals onto corresponding servo bands of a magnetic tape, the servo writer comprising:
    a magnetic tape traveling system including a supply reel and a take-up reel, the magnetic tape traveling system for traveling the magnetic tape by taking up the magnetic tape being fed from the supply reel with the take-up reel;

a DC erase head for magnetizing at least the servo bands in one direction along length of the magnetic tape, while being in contact with the traveling magnetic tape;

a servo signal write head for writing the servo signals onto the corresponding servo bands by magnetizing the servo bands in a direction opposite to the one direction, while being in contact with the traveling magnetic tape, the servo signal write head being provided downstream of the DC erase head in a traveling direction of the magnetic tape;

a servo signal read head for reading the servo signals that has been written onto the corresponding servo bands, while being in contact with the traveling magnetic tape, the servo signal read head being provided downstream of the servo signal write head in the traveling direction of the magnetic tape;

a control device for controlling a recording current supplied to the DC erase head based on outputs read from the servo signals by the servo signal read head; and an amplifier for amplifying the outputs being read from the servo signals by the servo signal read head and for transmitting the amplified outputs to the control device, wherein the DC erase head has head gaps which are formed to cover width of the magnetic tape, and which subject a whole surface of the magnetic tape to DC magnetization, the servo writer further comprising an AC erase head provided downstream of the DC erase head, the AC erase head subjecting a DC-magnetized data band to AC magnetization.

13. A servo writing method for writing a servo signal onto a servo band of a magnetic tape, the servo writing method comprising;

a DC magnetizing step of magnetizing the servo band in one direction along length of the magnetic tape by a DC erase head;

a servo writing step of writing the servo signal onto the servo band by magnetizing the servo band in a direction opposite to the one direction by a servo signal write head;

a reading step of reading the servo signal; and a control step of controlling a recording current supplied to the DC erase head based on an output having been read from the servo signal in the reading step.

14. A servo writing method according to claim 13, further comprising an amplifying step for amplifying the output that has been read from the servo signal in the reading step, the amplifying step being performed between the reading step and the control step.

* * * * *